(12) United States Patent
Kuper et al.

(10) Patent No.: US 11,574,251 B2
(45) Date of Patent: Feb. 7, 2023

(54) LIVESTOCK AND FEEDLOT DATA COLLECTION AND PROCESSING USING UHF-BAND INTERROGATION OF RADIO FREQUENCY IDENTIFICATION TAGS FOR FEEDLOT ARRIVAL AND RISK ASSESSMENT

(71) Applicant: PERFORMANCE LIVESTOCK ANALYTICS, INC., Ames, IA (US)

(72) Inventors: Dane T. Kuper, St. Ansgar, IA (US); Dustin C. Balsley, Osage, IA (US); Paul Gray, Cedar Falls, IA (US); William Justin Sexten, Columbia, MO (US)

(73) Assignee: PERFORMANCE LIVESTOCK ANALYTICS, INC., Ames, IA (US)

( * ) Notice: Subject to any disclaimer, the term of this patent is extended or adjusted under 35 U.S.C. 154(b) by 43 days.

(21) Appl. No.: 17/364,510

(22) Filed: Jun. 30, 2021

(65) Prior Publication Data
US 2021/0326764 A1 Oct. 21, 2021

Related U.S. Application Data

(63) Continuation of application No. 16/852,826, filed on Apr. 20, 2020, now Pat. No. 11,055,633, which is a (Continued)

(51) Int. Cl.
*G06N 20/00* (2019.01)
*G06K 7/10* (2006.01)
(Continued)

(52) U.S. Cl.
CPC ............ *G06N 20/00* (2019.01); *A01K 5/02* (2013.01); *A01K 11/008* (2013.01);
(Continued)

(58) Field of Classification Search
CPC ........ G06N 20/00; G06N 20/10; G06N 20/20; G06N 7/00; A01K 5/02; A01K 5/0283;
(Continued)

(56) References Cited

U.S. PATENT DOCUMENTS 9,924,700 B1 * 3/2018 Kuper .................... H04W 4/02
10,628,756 B1 4/2020 Kuper et al.
(Continued)

FOREIGN PATENT DOCUMENTS

WO WO 2015127228 A1 8/2015
WO WO 2018109725 A1 6/2018

OTHER PUBLICATIONS

International Search Report and Written Opinion of PCT/US2020/050257, dated Jan. 22, 2021.

*Primary Examiner* — Shane D Woolwine
(74) *Attorney, Agent, or Firm* — Lazaris IP

(57) ABSTRACT

An agricultural data collection framework is provided in a system and method for tracking and managing livestock, and for analyzing animal conditions such as health, growth, nutrition, and behavior. The framework uses ultra-high frequency interrogation of RFID tags to collect individual animal data across multiple geographical locations, and incorporates artificial intelligence techniques to develop machine learning base models for statistical process controls around each animal for evaluating the animal condition. The framework provides a determination of normality at an individual animal basis or for a specific location, and generates alerts, predictions, and a targeted processing or application schedule for prioritizing and delivering resources when intervention is needed.

30 Claims, 2 Drawing Sheets

Related U.S. Application Data continuation of application No. 16/569,503, filed on Sep. 12, 2019, now Pat. No. 10,628,756.

(51) Int. Cl.

| | |
|---|---|
| *A01K 29/00* | (2006.01) |
| *A01K 5/02* | (2006.01) |
| *H04W 4/029* | (2018.01) |
| *H04W 4/80* | (2018.01) |
| *A01K 11/00* | (2006.01) |
| *G06N 7/00* | (2006.01) |
| *G06N 20/20* | (2019.01) |
| *G06Q 50/02* | (2012.01) |
| *G06Q 10/06* | (2012.01) |
| *H04W 4/02* | (2018.01) |
| *H04W 4/70* | (2018.01) |
| *G06K 17/00* | (2006.01) |
| *G06Q 10/0639* | (2023.01) |

(52) U.S. Cl.
CPC ........ *A01K 29/005* (2013.01); *G06K 7/10366* (2013.01); *H04W 4/029* (2018.02); *H04W 4/80* (2018.02); *A01K 5/0283* (2013.01); *G06K 17/0029* (2013.01); *G06N 7/00* (2013.01); *G06N 20/20* (2019.01); *G06Q 10/0639* (2013.01); *G06Q 50/02* (2013.01); *H04W 4/02* (2013.01); *H04W 4/70* (2018.02)

(58) Field of Classification Search
CPC ............... A01K 29/005; A01K 11/008; G06K 7/10366; G06K 17/0029; H04W 4/02; H04W 4/70; H04W 4/029; H04W 4/80; G06Q 10/0639; G06Q 50/02
See application file for complete search history.

(56) References Cited

U.S. PATENT DOCUMENTS

| | | |
|---|---|---|
| 11,055,633 B2 | 7/2021 | Kuper et al. |
| 2013/0222141 A1 | 8/2013 | Rhee et al. |
| 2014/0122156 A1 | 5/2014 | Jung et al. |
| 2017/0280687 A1 | 10/2017 | Vrabete et al. |
| 2019/0053470 A1 | 2/2019 | Singh et al. |
| 2019/0090459 A1* | 3/2019 | Adams ................ A01K 1/0023 |
| 2019/0335715 A1 | 11/2019 | Hicks et al. |
| 2019/0380311 A1 | 12/2019 | Crouthamel et al. |
| 2020/0143157 A1* | 5/2020 | Borchersen ............ G06V 40/10 |
| 2020/0196568 A1 | 6/2020 | Robertson et al. |

* cited by examiner

LIVESTOCK AND FEEDLOT DATA COLLECTION AND PROCESSING USING UHF-BAND INTERROGATION OF RADIO FREQUENCY IDENTIFICATION TAGS FOR FEEDLOT ARRIVAL AND RISK ASSESSMENT

CROSS-REFERENCE TO RELATED PATENT APPLICATION(S)

This patent application claims priority to, and is a continuation of, U.S. non-provisional application Ser. No. 16/852,826, filed on Apr. 20, 2020 (issuing as U.S. Pat. No. 11,055,633 on Jul. 6, 2021), and U.S. non-provisional application Ser. No. 16/569,503, filed on Sep. 12, 2019 (now U.S. Pat. No. 10,628,756, issued on Apr. 21, 2020), the contents of all of which are incorporated in their entirety herein. In accordance with 37 C.F.R. § 1.76, a claim of priority to each of these applications and patents is included in an Application Data Sheet filed concurrently herewith.

FIELD OF THE INVENTION

The present invention relates to feedlot data collection and processing. Specifically, the present invention relates to data collection using ultra-high frequency interrogation of radio frequency identification (RFID) tags, and application of machine learning techniques to discern and predict animal health issues and other conditions relative to geographical regions, feedlots, pastures, pens, and other enclosures for livestock.

BACKGROUND OF THE INVENTION

Existing technology for electronically tracking herds of livestock typically involve storing data on radio-frequency identification tags, and using scanners to interrogate and obtain data from those tags. Present scanning techniques, however, have disadvantages that limit its utility in collecting and processing livestock-related information. For example, scanning distance using low-frequency interrogation systems is on the order of centimeters, meaning that the interrogation devices must be in close proximity to the livestock and RFID tags from which data is to be collected. Further, low-frequency scanners can only scan one RFID tag at a time, do not allow for simultaneous interrogation of multiple tags in a single instance or sweep.

This has the practical limitation of limiting the data pipeline of collections over a large geographical area. Therefore, obtaining such information and moving it into cloud-based storage paradigms is not common practice in the livestock management industry, because the issues described above severely impact the ability to perform advanced data analytics on livestock over wider geographical areas.

Another problem faced by the livestock industry is a limited ability to process data collected by interrogating radio-frequency identification tags for large numbers of livestock over a wide geographical area, and analyzing such information by region, by farm, by feedlot, by pasture, by pen, or by any other such metric. In other words, the combined nature of collecting data and analyzing livestock across a wide area means that an application utilizing artificial intelligence techniques in a data mining process that folds RFID tag data with additional data sources representing weather, markets, and other relevant information, is limited by the ability to interrogate tags and obtain data needed for such analytics.

Solutions to the problems above are key due to increased attention on food security and traceability. Therefore, being able to track and process livestock in a combined approach that is able to quickly obtain and store data across wide distances and for multiple regions is helpful for many reasons, such as monitoring animal health, understanding and promoting improvements in livestock growth and milk production, modeling feed intake rate and inventory needs over the course of a growing season or feeding period, and enhancing food system sustainability.

There is therefore a need in the existing art for improvements in collecting livestock data over a wide geographical area and in the ability to analyze livestock data attributes using such data, in an approach that applies artificial intelligence techniques to predictive data analytics and which combines RFID tag data with other data to better understand and manage the many issues attendant to maintaining a livestock population.

BRIEF SUMMARY OF THE INVENTION

The present invention is an agricultural data collection framework, provided in one or more systems and methods for evaluating conditions of livestock across multiple geographical locations. The agricultural data collection framework uses ultra-high frequency interrogation of RFID tags to collect individual animal data across multiple regions, farms, feedlots, pastures, pens, and any other location or enclosure where animals are maintained, and incorporates artificial intelligence techniques to develop machine learning base models for statistical process controls around each animal for tracking and managing livestock, and for analyzing animal conditions such as health, growth, nutrition, and behavior.

Application of ultra-high frequency bulk reading of RFID tags enables interrogating multiple tags at the same time, and detection of a known grouping of objects such as livestock across multiple locations. Such an interrogation paradigm enables process support for applying analytical, algorithmic tools to determining normality at an individual animal basis or for a specific location, and prioritizing and delivering resources when intervention is needed in response to deviations from such a normality, due at least in part because of the greater range associated with reading RFID tags over ultra-high frequency bands. The use of UHF-band interrogation addresses temporal issues with such a large-scale collection approach, and enables advanced data analytics involving applications of artificial intelligence and machine learning in a data mining process that combines the collected livestock data with additional, relevant data sources. Such a framework, it is to be noted, is not limited to livestock populations, but is usable in any agricultural environment in which RFID tags are deployed to store information.

It is one objective of the present invention to provide a system and method of large-scale collection of livestock data for evaluation of animal conditions. It is another objective of the present invention to provide a system and method of applying advanced data analytics to such a large-scale collection of data. It is yet another objective of the present invention to utilize ultra-high frequency interrogation of RFID tags affixed to livestock for such a large-scale collection of data over multiple regions, feedlots, farms, pastures, pens, or other enclosures where animals are maintained in multiple geographical locations.

It is another objective of the present invention to augment livestock data obtained from such UHF-band interrogation of RFID tags with other data relative to the animal condition being evaluated, such as environmental data, nutrition data, regional data, animal-specific data, market data, and other producer-augmented or generated data. It is still another objective of the present invention to provide a framework for data collection and analytics that includes a determination of normality at an individual animal basis or for a specific location for animal conditions such as health, growth, nutrition, and behavior. It is yet another objective of the present invention to generate alerts, predictions, and a targeted processing or application schedule for prioritizing and delivering resources when intervention is needed based on such a determination of normality, and deviations therefrom.

Other objects, embodiments, features, and advantages of the present invention will become apparent from the following description of the embodiments, which illustrate, by way of example, principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention is, as noted above, an agricultural data collection and processing framework 100, provided in one or more systems and methods for utility in precision agriculture, and specifically for livestock tracking and management. The agricultural data collection and processing framework 100 utilizes ultra-high frequency (UHF) band interrogation of RFID tags associated with livestock, and analyzes livestock tracking and management characteristics in evaluating an animal condition, and uses those characteristics to determine and predict data attributes for an allocation and prioritization of livestock-related resources over a wide geographical area for responsiveness to animal conditions.

UHF scanning of RFID tags provides immediate advantages over low-frequency alternatives. The scan distance is much greater, on the order of meters rather than centimeters with low-frequency scanning. Also, UHF scanning allows for simultaneous scanning of multiple tags in a single sweep, whereas other technologies can only scan one tag at a time. Further, high frequency scanners are able to penetrate deeper, for example through metals used for animal enclosures, increasing accuracy in the processing of data collected by being able to reach more RFID tags for interrogation.

The agricultural data collection framework 100 contemplates that many different modeling approaches may be applied in the present invention, and such approaches may also be referred to or described herein as an application of both statistical process controls for change detection algorithms, and artificial intelligence and machine learning, to combined analytics involving the collection and processing of livestock data. These different modeling approaches are used in the framework 100 to determine a normality for a specific animal or for specific location as it pertains to a modeled animal condition, and predicting or otherwise generating one or more outcomes using such a normality determination. Regardless, the present invention enables improved accuracy in predicting data attributes that impact attributes in a livestock life cycle such as health, growth and milk production. Outputs from the framework, whether in the form of predictions, alerts, or otherwise, assist in allocating and prioritization usage of resources for livestock tracking and management. Further, the present invention allows producers of livestock to ensure that animals receive the diet, nutrition, health supplements, and veterinary care needed in response to such predictions and/or allocations and prioritizations.

Figure 1:
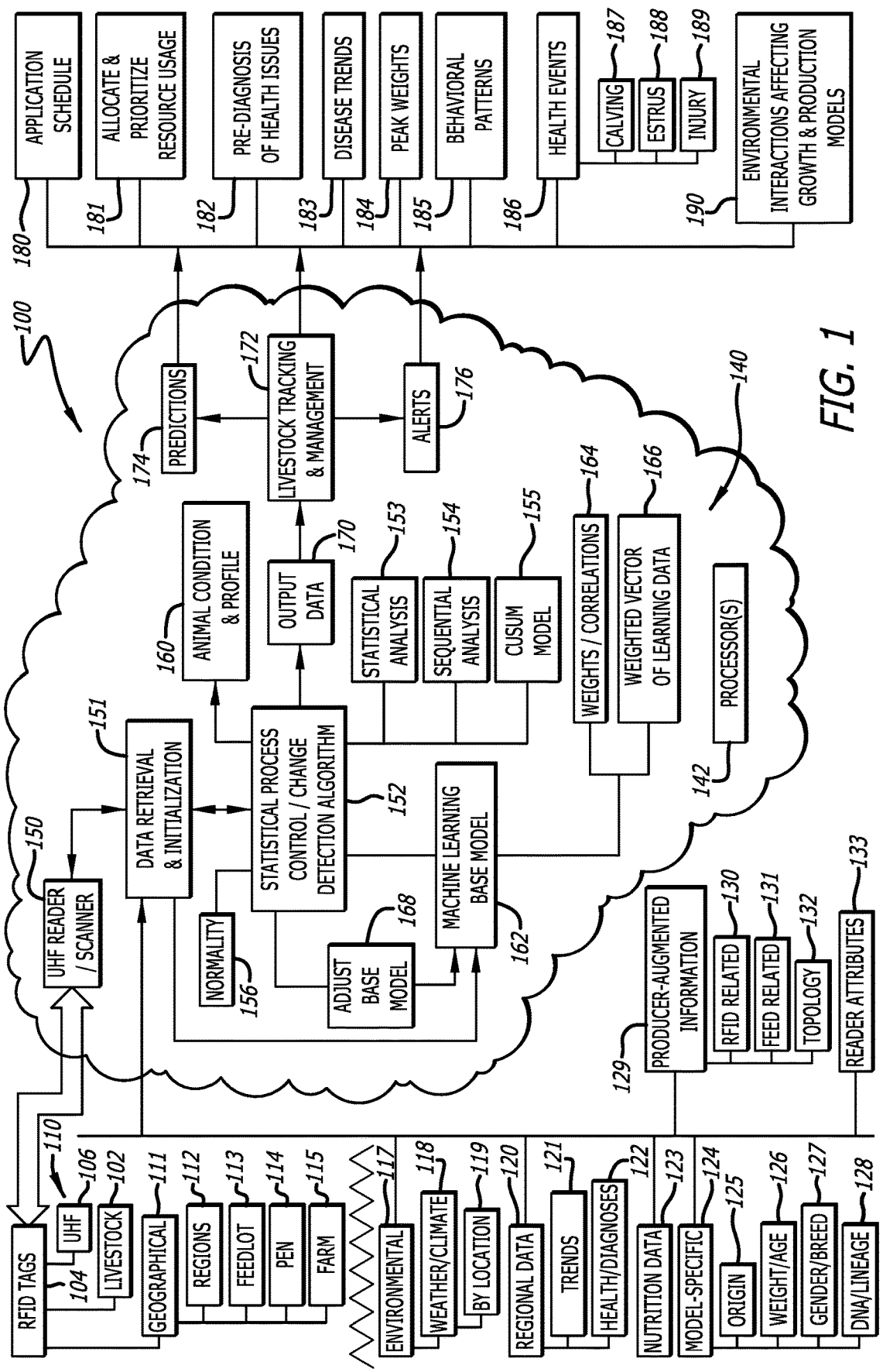
FIG. 1 is a system diagram illustrating components in an agricultural data collection and processing framework for analyzing data attributes in livestock tracking and management according to one embodiment of the present invention.

FIG. 1 is a block diagram illustrating system components of the agricultural data collection and processing framework 100 for combined analytics in analyzing an animal condition 160, and determining and predicting data attributes for livestock tracking and management over a wide geographical area. The framework 100 applies a plurality of input data 110 to one or more mathematical processes within a multi-faceted machine learning platform. These processes may include standardized models, and may also include one or more models customized according to proprietary formulas. Regardless, the application of artificial intelligence and machine learning enables such mathematical processes to be trained to identify data that is relevant to particular attributes of an animal condition 160, and adjust outcomes accordingly. Further, the application artificial intelligence and machine learning may enable the framework 100 to select a particular or most appropriate model or models, or combinations thereof, for specific or desired outputs. Regardless, the framework 100 generates output data 170 that includes predictions 174, alerts 176, or other information relevant to livestock tracking and management 172, and may be configured to produce a wide range of information attendant to such livestock tracking and management 172.

The data collection aspect of the framework 100 collects input data 110 by interrogating radio-frequency identification (RFID) tags 104. Each head of livestock 102 has at least one RFID tag 104 coupled to it, which stores relevant information about the animal to which it is coupled. RFID tags 104 are interrogated using ultra-high frequency (UHF) scanners or readers 150, which are part of a plurality of data processing components 144 (not shown in FIG. 1) within a computing environment 140 in which the systems and methods described herein are performed for analytical processing, such as applying one or more process or mathematical models within a component(s) configured to develop machine learning base models and 162 perform statistical process controls in one or more change detection algorithms 152 on relevant input data 110. The computing environment 140 may include one or more processors 142 and a plurality of software and hardware components, and the one or more processors 142 and plurality of software and hardware components may be configured to execute program instructions or routines to perform the functions performed within the plurality of data processing components 144.

It is to be understood that the plurality of data processing components 144 are shown in FIG. 1 by their specific, respective reference numerals as indicated below. It is to be further understood that these components 144 are part of the larger computing environment 140, and constitute one or more structures, hardware, firmware, or software, such as algorithms, routines, sub-routines, and the like, that are specifically configured to execute particular functions within the agricultural data collection and processing framework 100. It is to be additionally understood that the data processing components 144, and the respective elements of the present invention that together that comprise these specifically-configured components, may interchangeably be referred to as "components," "modules," "algorithms" (where appropriate), and any other similar term that is intended to indicate an element for carrying out a specific data processing function.

The data processing components 144 also include a data retrieval and initialization module 151, which is configured to ingest, receive, request, or otherwise obtain input data 110, whether it be from interrogating RFID tags 104, or from additional sources as described further herein. This data retrieval and initialization module 151 may also be configured to condition or format raw input data 110 from the RFID tags 104, and from such additional sources, so as to be prepared for the artificial intelligence and machine learning 162 and statistical process control and change detection algorithms 152 aspects of the framework 100.

In the agricultural data collection and processing framework 100 of the present invention, information obtained by the UHF readers 150 from the RFID tags 104 may also include geographical information 111, which correlates the livestock information in a RFID tag 104 with location data. Data about livestock 102 may therefore be geo-tagged with information identifying a region 112, a feedlot 113, a pen 114, a farm 115, or any other type of enclosure or location where livestock 102 are maintained.

Geographical location data 111 may be correlated with Global Positioning System (GPS) and tracking data for enhancement of the input data 110, and therefore a RFID tag 104 may include one or more GPS data points representative of the region 112, feedlot 113, pen 114, or farm 115 in which the tag 104 is located. The framework 100 may therefore utilize components such as a GPS-enabled receiver in conjunction with UHF readers 150 to detects signals relative to the geographical location to compute the tag's precise position on Earth using the one or more GPS data points. The GPS-enabled receiver may thereby extract and determine the geographical location of the tag 104 from the GPS data points.

UHF interrogation of RFID tags 104 may be initiated by the data retrieval or initialization component 151, or may occur automatically and independently thereof. Regardless, data obtained as a result of this UHF interrogation is then transferred and stored by the data retrieval and initialization module 151 for further processing as discussed below.

The data retrieval and initialization module 151 is also configured to ingest, receive, request, or otherwise obtain additional information that aids the framework 100 in processing the input data 110 collected from RFID tags 104, by augmenting livestock data and geographical data 111 with other data that is relevant to evaluating, modeling and diagnosing an animal condition 160. This additional information may include environmental data 117, regional data 120, nutrition data 123, regional animal-specific or model-specific data 124, producer-augmented data 129, and reader attributes 133, and regardless of its type, may include any information not temporally gathered directly or on site, such as for example market pricing (such as livestock commodities data for live cattle, feeder cattle, corn, and milk future prices), disease outbreaks in other geographies, etc. It should be noted however that in some cases this additional information may be stored on the RFID tags 104, regardless of the time or place it was gathered or generated.

Environmental data 117 includes both ambient climatological or meteorological information relative to where livestock 102 are maintained or where a RFID tag 104 resides, as well as spatial and other non-weather physical conditions. For example, environmental data may include weather and climate information 118, such as temperature, precipitation, humidity, barometric pressure and other weather-related characteristics for the area or location where the RFID tag 104 resides or the livestock 102 is maintained. Weather and climate information may also include short and long term weather predictions and forecasts for that same area or location. Environmental data 117 may also, as suggested above, be parsed by location 119, and may indicate a type and size of pen or enclosure (for example, an indication that livestock are kept in a barn or freestall, and the size of each), field and pasture conditions (for example, USDA Drought Monitor), and available grazing vegetation, where the livestock 102 are maintained.

Regional data 120 may further include trend and diagnosis information for the region where a RFID tag 104 resides, or where livestock 102 are maintained. Such trend and diagnosis information may provide health information and forecasts for the livestock by region which may impact, growth and behavior going forward, and which may influence growth and dairy production modeling. For example, regional data 120 may indicate that respiratory treatments within a particular data collection region are up 30% for the present quarter, or that a diagnosis of foot rot is expected to be 15% higher in the next quarter due to higher regional precipitation the last 30 days.

Nutritional information 123 may provide feed and forage data for a particular region or animal. For example, nutritional information may indicate that a predominant feed type specifically consists of some percentage of dry matter, or may more broadly provide a breakdown of feed nutrient percentages over time. Nutritional data 123 may also provide the mathematical formula by which weight gain allowance from energy intake is analyzed, such as for example in a net energy gain model or net energy required for maintenance model. Nutritional data 123 may also provide the mathematical formula by which milk production from energy intake is analyzed, such as for example in a net energy lactation model. Nutritional data 123 may also indicate what supplements or pharmaceuticals have been provided as part of a feed mix, and when.

Model or animal-specific data 124 includes information that identifies, and is particular to, an animal or group of animals, and which enables an arrival or risk assessment that can serve as a starting point where producer has entered all known information on the animal, before any processing data or additional decisions are made. Specific examples of this arrival or risk assessment information in model-specific data 124 may include an origin 125, a changing value such as its current weight or age 126, a gender or breed 127, and a DNA or lineage 128. It may also include information such as purchase weight and location, as well as a distance traveled, weaning status, vaccination status, shrink (pay weight less arrival weight), and other information that enables a robust risk assessment where a series of decision tree questions are utilized to categorize a health risk that influences other processing protocols. The arrival and risk assessment may therefore provide the agricultural data collection framework 100 with a complete animal health history. It should be noted that this arrival and risk assessment data may be procured from many sources, such as directly from an RFID tag 104 itself, from a reference database maintained or stored separately, or provided by third party sources such as another user of the framework 100 or from a third party or separate system integrated with the framework 100.

The processing of input data 110 in the framework 100 may be further augmented with producer-augmented information 129 that may include many different types of data. The producer-augmented information 129 may include RFID tag-related data 130, such as for example an identification of correlated events relative to livestock 102. RFID tag-related data 130 may also indicate events such as new RFID tags 104 being added to the geographical location being monitored, events such as RFID tags 104 being removed from the geographical location due to tag defect or destruction or animal death, events that represent a replacement of a RFID tag 104 or assumption of a previous history with a new tag 104, and events indicative of tag breakage or multiple tags present on the same animal.

Other producer-augmented information 129 may include feed-related data 131 such as feed delivery properties. Such properties may include a time of delivery, a composition of a ration, an amount of feed delivery (and an amount of each component of a ration delivered at a particular time, and a bunk score. Still other producer-augmented information 129 may include a geographical topology 132 representing the location in which a tag 104 is located. This may include a region size and other details of a coverage region, such as terrain characteristics, a presence and location of available water, field boundaries, and other relevant information.

Additional producer-augmented information 129 may include management information such as vaccination and treatment history, production technology use or sorting history. Further health-related management information may include confirmed diagnoses, confirmed recovery from illness, treatments used to address diagnoses and illnesses, etc.

The processing of input data 110 in the framework 100 may also be augmented with reader attributes 133. These attributes 133 may include absolute or relative reader location details, antenna power settings, date and time attributes, and a tag RSSI (Receive Signal Strength Indicator). Ambient conditions sensed around the tag 104 may also be included, such as temperature and moisture, and as noted below, sensors and other hardware may be utilized in conjunction with tags 104 to provide information about such ambient conditions.

Input data 110 may be further augmented in another embodiment of the present invention using hardware devices that are associated with or proximate to RFID tags 104. For example, an inclinometer may be utilized to measure an angle of inclination of livestock at various times of a day, for example when presumed to be feeding, to further and more accurately evaluate characteristics such as head down duration and eating rate, as well as to more accurately determine feeding and non-feeding times and intervals where univariate or multi-variate models of such characteristics are applied. It is therefore to be understood that the present invention may incorporate input data 110 that come from not only from third party sources, but also sensors and other hardware devices than may be utilized in conjunction with livestock 102.

Regardless of the type of input data 110 that is ingested to augment data from RFID tags 104, the data retrieval and initialization component 151 provides the information to an artificial intelligence engine, which is configured to develop one or more machine learning base models 162 of one or more characteristics impacting the animal condition 160. The one or more machine learning base models 162 include algorithms that identify additional information from the input data 110 and obtain such additional information from one or more sources as noted above.

The machine learning base models 162 then assign weights 164 to the input data 110. These weights 164 represent biases in the input data 110 relative to the animal condition 160, and may be assigned based on multiple variables or factors, such as for example a prior response or responses to an animal condition 160 being modeled, either in the form of a specific treatment or within a geographical location similar to that within which the animal condition 160 is being modeled. Regardless, the weights 164 are aggregated to generate a weighted vector of learning data 166 that is provided to the statistical process controls in the change detection algorithms performed by the component 152.

The statistical process controls and change detection algorithms 152 apply one or more mathematical processes to the output of the machine learning base models 162 to evaluate the animal condition 160 and generate a corresponding profile. These mathematical processes are applied to perform change detection, at least by identifying tracking and management characteristics 172 of the livestock 102 and a normality 156 of the animal condition 160. These mathematical processes at least include a statistical analysis 153, a sequential analysis 154, and a cumulative summation (CUSUM model) 155. Regardless of the mathematical process or model used to evaluate the input data 110 and the weighted vector of learning data 166, they may be derived from existing, standardized models, and may also include models that are customized to incorporate unique characteristics based upon the input data 110 discussed above and the specific animal condition 160 being profiled.

The resultant profile of the animal condition 160 is then applied across the multiple geographical locations in which the one or more animals are located to determine a normality 156 relative to a specific animal in the one or more animals, and identify differences in the animal condition 160 for a specific geographical area. The framework 100 is therefore configured to develop statistical process controls and perform change detection analyses around each animal for a determination of normal at an individual animal basis, so that opportunities for intervention where the artificial intelligence engine identifies deviations from such normality determinations can be quickly performed. The present invention may therefore be understood to be, in one aspect thereof, a framework 100 for evaluating animal health that tries to identify healthy animals and healthy conditions rather than sick or unhealthy ones, so that conditions outside of normal parameters can be classified as such and diagnosis, treatment, and prevention proceeds from there as a starting point.

The profile of the animal condition 160, and livestock tracking and management characteristics 172 therein, may be generated as output data 170 as discussed further below, and may also be provided back to the machine learning base models 162 and used to adjust and/or train a base model 168.

The framework 100 therefore "learns" from outcomes of the statistical process control and change detection algorithms 152 to improve the weights and correlations 164 assigned to the input data 110, and the corresponding weighted vector of learning data 166 for each animal condition 160 modeled. Therefore, the framework 100 incorporates a feedback loop in the form of adjustments to the base model 168 that enables validation of the statistical process control and change detection algorithms 152 and the predictions 174 and alerts 176 generated therefrom as output data 170.

The output data 170 includes, as noted above, predictions 174 and alerts 176 that are the result of livestock tracking and management characteristics 172 in the profile of the animal condition 160. The livestock tracking and management characteristics 172, predictions 174 and alerts 176 may be provided to users via a display, such as a graphical user interface, interactive or otherwise, for example via a support tool or other mechanism.

Many manifestations of the livestock tracking and management characteristics 172, predictions 174 and alerts 176 in the output data 170 are contemplated and within the scope of the present invention. In one aspect of the present invention, the output data 170 may be used to develop and application schedule 180 for delivery of a response in an intervention to deviations from the normality 156 as discussed above, and to allocate and prioritize resource usage 181 for such a response. Output data 170 may also include specific information derived from the livestock tracking and management characteristics 172, predictions 174 and alerts 176, such as for example a pre-diagnosis of health issues 182, identification of disease trends 183, peak livestock weights 184, behavioral patterns 185 (for example, grazing behavior suggestive of inadequate pasture), and indications of specific health events 186, such as calving 187, estrus 188, and injury 189. The output data 170 may further be processed to identify environmental interactions 190 that affect other livestock models, such as growth models and dairy production models.

Many other services and outcomes are possible, and may be provided either by directly by the framework 100 itself, or through one or more application programming interfaces (APIs). For example, the framework 100 may include modules configured to generate predictions 174 and alerts 176 to marketing organizations interested in when cattle will come of weight in the future, manufacturers of particular feed components interested in when medicine, additives and supplements should be re-ordered, nutritionists and veterinary visits scheduled, and buyers or auctioneers of livestock notified. It is to be understood that many types of predictions 174 and alerts 176 are possible within the present invention, and it is not to be limited to any one type of prediction 174 or alert 176 mentioned herein. The present invention may, as suggested above, also enable one or more additional and specific APIs to provide particular information or services and generate specific outcomes from the output data 170 and the livestock tracking and management characteristics 172, predictions 174 and alerts 176 that are generated from the framework 100.

In one example where the framework 100 of the present invention may be applied, UHF readers of scanners 150 are deployed across a feedlot 113 that includes one or more pens 114, alleys, loading/unloading areas, and other places where livestock 102 may be located. Deployment locations for the UHF readers/scanners 150 may include all regions of the feedlot 113, so that no areas are explicitly excluded. This includes areas with "attractants" such as water and feed sources, as well as areas without (for example, holding pens may be provided with water or food). The enables input data 110 for animals in geographic areas marked as being without attractants during feeding times to also be data points of interest for the machine learning base models 162.

RFID tags 104 are read in real time by the UHF reader devices 150. Input data 110 collected from the tags 104 may be provided to an aggregated storage mechanism, such as a relational database, along with reader attributes 133 and any other relevant data points collected from the feedlot 113. Such input data 110 may be directly presented to the aggregated storage mechanism from the readers 150 using network, cellular, Wi-Fi, Bluetooth, or other comparable communications network. Alternatively, input data 110 may be presented to the aggregated storage mechanism through the use of data pass-through devices, which are devices which collect data from the readers 150 and act as a liaison to pass the data to the aggregated storage mechanism. Examples of pass-through devices include tablets, cellular devices, a point ("smart") scale head or other device capable of collecting data from the readers 150 and passing information to the storage mechanism using an IP network such as Wi-Fi, or serial communications protocol such as Bluetooth, NFC (near-field communication), or the like. Pass-through devices may include "smart" phones or other computing devices, and may be transitory devices mounted to trucks, tractors, other agricultural implements, manned or unmanned, as well as to manned or unmanned flight vehicles. Regardless, in such an example input data 110 is pooled and combined with optional on-demand sources of additional information for the artificial intelligence engine in the one or more machine learning base models 162, and for the statistical process controls and change detection algorithms 152.

In an exemplary approach, the input data 110 for evaluating a particular animal condition 160 may include DNA (genetic history) and lineage (origin) of livestock 128, and any treatment histories derived therefrom; water tank data (such as frequency and duration of water consumption), feed bunk data (such as frequency and duration of feed ration consumption). The one or more machine learning base models 162 takes these inputs develops correlations and weights 164 to generate the weighted vector space of learning data 166 based on any actual, historical producer-specified treatments provided for the animal condition 160. This learning process is followed by a real-time predictive analysis performed by the statistical process controls and change detection algorithms 152 to identify livestock tracking and management characteristics 172 where there is a possible deviation from a normality 156 for a particular geographical location (such as the feedlot 113) to identify sick livestock before they show any visual signs of stress or illness or otherwise become in need of treatment. The set of input data 110 may be further augmented with data outside of the producer's feedlot 113, such as with nutritional ration data, weather data, treatments at other locations in a supply chain, for example cow/calf, backgrounder or stocker operations, or a calf ranch or heifer raiser, brands of treatments (generic versus commercial), etc.

The learning data based on the actual producer treatment data is used in real time to predict animals with behaviors that would also lead to producer treatments of the current livestock 102. These animals would be identified for the producer to do a "pre-check" health determination, allowing the producer to possibly prevent further outbreak or animal death.

Figure 2:
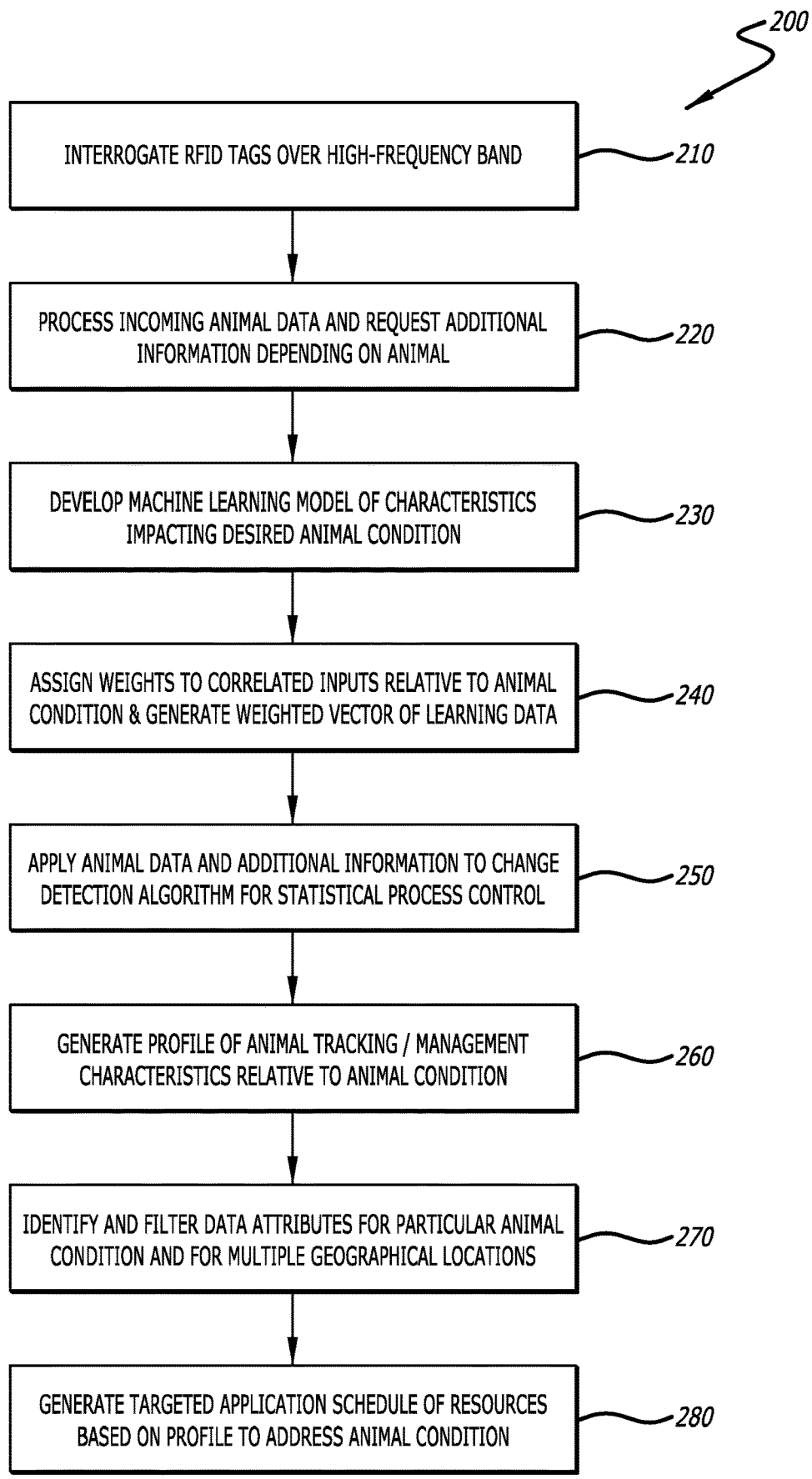
FIG. 2 is a flowchart of steps in a process of performing an agricultural data collection and processing framework for analyzing data attributes in livestock tracking and management according to one embodiment of the present invention.

FIG. 2 is a flowchart illustrating a process 200 for performing the framework 100 of the present invention. The process 200 begins at step 210 by interrogating RFID tags 104 as noted above with readers 150 utilizing a high-frequency communications band (UHF) to begin the processing of onboarding input data 110 relative to evaluating an animal condition 160. This information is initially processed to determine what additional information may be requested and obtained to perform the various processing steps for evaluating the animal condition 160 at step 220.

Detailed processing of the input data 110 in the framework 100 then begins at step 230, with the development of machine learning base models 162 in the artificial intelligence component of the present invention. The models 162 evaluate the input data 110 and additional information for the animal condition 160 at issue (or for a particular geographical location) and identify biases and correlations between one or more variables which are used to assign weights 164, at step 240. These weighted 164 variables are used to compile a vector space of weighted learning data 166.

At step 250, the weighted vector data set 166 is applied to change detection algorithms 152 for statistical process, using as noted above one or more mathematical processes to identify a deviation from normality 156 for the animal condition 160. At step 260, the framework 100 and process 200 generate a profile of the animal condition 160 and tracking and management characteristics 172 relative the animal condition 160. The process then filters and identifies data attributes for a particular animal condition 160 and for one or more geographical locations at step 270, and in one aspect of the present invention generates a targeted application schedule 180 of resources based on the profile to address the animal condition 160 at step 280. As noted above, this may include an allocation and prioritization of resources, and may further be present on a display for a user or producer to take further specific action.

Returning to FIG. 1, as noted above, the framework 100 for developing livestock tracking and management characteristics 172 for analyzing an animal condition 160 is a multi-faceted approach that performs, in one aspect thereof, different mathematical processes for evaluating change detection to determine a normality 156 and predict any deviations therefrom. These mathematical processes include a statistical analysis 153, a sequential analysis 154 (a specific type of statistical analysis), and a cumulative sum analysis (a specific type of sequential analysis). The selection of the process to be utilized depends on the type of animal condition 160 being modeled, and on the types of input data 110. And, as noted above, a particular process may be customized depending on similar characteristics (the type of animal condition 160, and the type of input data 110).

For example, the present invention may evaluate an animal condition 160 such as the effectiveness and accuracy of monitoring feeding behavior patterns, which may be utilized to predict the onset of health issues such as bovine respiratory disease in beef cattle. The framework 100 may apply one or more cumulative summation (CUSUM) models 155 that are each configured to evaluate univariate traits as they pertain to feeding, such as for example bunk visit frequency, bunk visit duration, head down duration, eating rate, time to bunk, and non-feeding intervals, or any other feeding-related characteristic. It is to be understood that these characteristics may be obtained or derived from input data 110, such as producer-augmented information 129, within the framework 100, and may not necessarily be obtained directly from RFID tags 104.

Outcomes from these models may be used to construct multivariate factors that are also monitored using CUSUM. From these constructs, accuracy may be selected based on the weighted vector of learning data 166 for the most pertinent and accurate predictive analysis. In this manner, a statistical process control can be implemented for evaluating change detection within the framework 100 for an appropriate allocation and prioritization of resources to address animal conditions 160.

Other uses of the output data 170 in the present invention are also possible, and within the scope of the present invention. In one embodiment, the output data 170 may be used to address specificity and sensitivity tolerances. In one example, the framework 100 may be used to match an operator labor resources or animal illness risk by adjusting output sensitivity and specificity to minimize candidate animals identified for treatment. In another example, the output data 170 specificity and sensitivity may be adjusted to inform a greater number of candidate animals due to high risk periods as determined environmental 117 or regional data 120 trends.

It is to be understood that the word "livestock" in the present invention may refer to any type of livestock 102 for which tracking and management characteristics 172 in analysis of an animal condition 160 may be developed, and the scope of this disclosure is not to be limited to any one specific type of livestock 102 referred to herein, nor is it likewise to be limited to one condition for any one type of livestock referred to herein. Livestock 102 may therefore include, but not be limited in any way to, beef cattle, dairy cattle, hogs, poultry, sheep, goats, bison, horses, etc. The present invention is therefore applicable to all types of livestock 102, and the modeling approach discussed herein may be adjusted depending on the type of livestock 102 being modeled.

The systems and methods of the present invention may be implemented in many different computing environments 140. For example, the statistical process control and change detection algorithms 152 may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. For example, the input data 110 may be augmented with data collected hardware devices in association with or proximate to a RFID tag, such as an inclinometer. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising: interrogating a plurality of radio-frequency identification (RFID) tags using at least one reader configured to communicate with the plurality of radio-frequency identification tags over an ultra-high frequency band to collect input data, the input data at least including data identifying one or more animals to which each RFID tag is coupled at a feedlot; analyzing the input data in a plurality of data processing modules within a computing environment in which the plurality of data processing modules are executed in conjunction with at least one processor, the plurality of data processing modules configured to analyze attributes indicative of animal health upon arrival of the one or more animals at the feedlot in one or more initial arrival protocols, by performing an arrival and risk assessment for the one or more animals upon arrival at the feedlot, in a machine learning base model that is configured to identify specific animals at risk of health changes, and one or more temporal decision points in a feeding period for addressing the health changes in the specific animals, by correlating the input data with one or more events representing animal health identified in livestock data from additional feedlots across multiple geographical locations, assigning weights to the input data and the one or more events to generate a weighted vector of learning data, applying the weighted vector of learning data to one or more statistical process controls to simulate the health changes in the specific animals at the feedlot as a vector space of the input data, augmenting the vector space with additional information representing weather data for the feedlot and the additional feedlots, producer-augmented data that includes nutrition data and feed delivery data for the feedlot and the additional feedlots, and health risk characteristics assessed during the initial arrival protocols and derived from the data identifying the one or more animals that includes one or more of a distance traveled, a weaning status, a vaccinations status, a gender, and a shrink weight, generating an animal health profile of livestock tracking and management characteristics over the feeding period for the one or more animals, predicting the health changes in one or more specific animals over the feeding period, and identifying specific health risk characteristics impacting the predicted health changes; and adjusting the initial arrival protocols at the feedlot for one or more later-arriving animals exhibiting the same or similar health risk characteristics upon arrival at the feedlot to categorize a health risk for each later-arriving animal.

2. The method of claim 1, further comprising generating, as output data, an identification of a predicted health change for the one or more specific animals over the feeding period, and an identification of one or more temporal decision points over the feeding period for addressing the predicted health change in the one or more specific animals, based on the animal health profile.

3. The method of claim 1, further comprising generating an initial diagnosis of a health change in the one or more specific animals that includes one or more of a peak weight, a drop in weight that exceed a pre-determined amount, and an increase in weight that exceeds a pre-determined amount, a livestock illness, and an identification of a trend indicative of a disease spread.

4. The method of claim 1, further comprising adjusting one or more a growth model or a dairy production model for each of the one or more specifics animal in response to the predicted health changes for the one or more specific animals.

5. The method of claim 4, further comprising applying the predicted health changes for each of the one or more specific animals to adjust the one or more of a growth model or a dairy production model for the one more animals at the feedlot.

6. The method of claim 1, further comprising generating a targeted application schedule for an allocation of resources to address the predicted health changes for the one or more specific animals at the one or more temporal decision points over the feeding period.

7. The method of claim 1, wherein the augmented data further includes observed animal health changes at the feedlot and additional feedlots across the multiple geographical locations, the observed animal health changes including one or more of a change in an animal health condition, a change in an animal dietary or nutrition condition, a change in an animal growth condition, and a change in an animal behavior condition, and wherein the weights assigned to the input data and the one or more events are derived from the observed animal health changes.

8. The method of claim 1, wherein the weather data includes historical and current weather information for at least one geographical location in the multiple geographical locations, and further includes one or more of temperature, moisture, precipitation, wind speed, solar radiation, and humidity for each geographical location or for a geographical location each reader is located.

9. The method of claim 1, wherein the producer-augmented data further includes data representative of a type of enclosure in which the one or more animals are maintained, field conditions where the one or more animals are maintained, and conditions of pasture for the one or more animals.

10. The method of claim 1, wherein the nutrition data further includes one or more of an ingredient composition, a diet, a ration, a feeding history, types of forage available to the one or more animals, and water data.

11. A system, comprising: a radio-frequency identification tag interrogation network configured to interrogate a plurality of radio-frequency identification (RFID) tags using at least one reader configured to communicate with the plurality of radio-frequency identification tags over an ultra-high frequency band and collect input data that at least includes data identifying one or more animals to which each RFID tag is coupled at a feedlot; and an artificial intelligence engine configured to model the input data by analyzing attributes indicative of animal health upon arrival of the one or more animals at the feedlot in one or more initial arrival protocols, by performing an arrival and risk assessment for the one or more animals upon arrival at the feedlot, in a machine learning base model that is configured to identify specific animals at risk of health changes, and one or more temporal decision points in a feeding period for addressing the health changes in the specific animals, by correlating the input data with one or more events representing animal health identified in livestock data from additional feedlots across multiple geographical locations, assigning weights to the input data and the one or more events to generate a weighted vector of learning data, applying the weighted vector of learning data to one or more statistical process controls to simulate the health changes in the specific animals at the feedlot as a vector space of the input data, augmenting the vector space with additional information representing weather data for the feedlot and the additional feedlots, producer-augmented data that includes nutrition data and feed delivery data for the feedlot and the additional feedlots, and health risk characteristics assessed during initial arrival protocols and derived from the data identifying the one or more animals that includes one or more of a distance traveled, a weaning status, a vaccinations status, a gender, and a shrink weight, generating an animal health profile of livestock tracking and management characteristics over the feeding period for the one or more animals, and predicting the health changes in one or more specific animals over the feeding period, and identifying specific health risk characteristics impacting the predicted health changes, wherein the initial arrival protocols at the feedlot are adjusted for one or more later-arriving animals exhibiting the same or similar health risk characteristics upon arrival at the feedlot to categorize a health risk for each later-arriving animal.

12. The system of claim 11, wherein the artificial intelligence engine is further configured to generate an identification of a predicted health change for the one or more specific animals over the feeding period, and an identification of one or more temporal decision points over the feeding period for addressing the predicted health change in the one or more specific animals, based on the animal health profile.

13. The system of claim 11, wherein an initial diagnosis of a health change in the of the one or more specific animals is generated, the initial diagnosis of a health change including one or more of a peak weight, a drop in weight that exceed a pre-determined amount, and an increase in weight that exceeds a pre-determined amount, a livestock illness, and an identification of a trend indicative of a disease spread.

14. The system of claim 11, wherein one or more a growth model or a dairy production model are adjusted for each of the one or more specific animals in response to the predicted health changes for the one or more specific animals.

15. The system of claim 14, wherein the predicted health changes for each of the one or more specific animals are applied to adjust the one or more of a growth model or a dairy production model for the one more animals at the feedlot.

16. The system of claim 11, wherein a targeted application schedule for an allocation of resources is generated to address the predicted health changes for the one or more specific animals at the one or more temporal decision points over the feeding period.

17. The system of claim 11, wherein the augmented data further includes observed animal health changes at the feedlot and additional feedlots across the multiple geographical locations, the observed animal health changes including one or more of a change in an animal health condition, a change in an animal dietary or nutrition condition, a change in an animal growth condition, and a change in an animal behavior condition, and wherein the weights assigned to the input data and the one or more events are derived from the observed animal health changes.

18. The system of claim 11, wherein the weather data includes historical and current weather information for at least one geographical location in the multiple geographical locations, and further includes one or more of temperature, moisture, precipitation, wind speed, solar radiation, and humidity for each geographical location or for a geographical location each reader is located.

19. The system of claim 11, wherein the producer-augmented data further includes data representative of a type of enclosure in which the one or more animals are maintained, field conditions where the one or more animals are maintained, and conditions of pasture for the one or more animals.

20. The system of claim 11, wherein the nutrition data further includes one or more of an ingredient composition, a diet, a ration, a feeding history, types of forage available to the one or more animals, and water data.

21. A method of assessing livestock at a feedlot, comprising: applying one or more artificial intelligence techniques to analyze one or more attributes indicative of animal health from input data obtained by interrogating a plurality of radio-frequency identification (RFID) tags using at least one reader configured to communicate with the plurality of radio-frequency identification tags over an ultra-high frequency band, the input data at least including data identifying one or more animals to which each RFID tag is coupled at a feedlot in one or more initial arrival protocols, by developing a machine learning base model that is configured to identify specific animals at risk of health changes, and one or more temporal decision points in a feeding period for addressing the health changes in the specific animals, by correlating the input data with one or more events representing animal health identified in livestock data from additional feedlots across multiple geographical locations, assign weights to the input data and the one or more events to generate a weighted vector of learning data, apply the weighted vector of learning data to one or more statistical process controls to simulate the health changes in the specific animals at the feedlot as a vector space of the input data, augment the vector space with additional information representing weather data for the feedlot and the additional feedlots, producer-augmented data that includes nutrition data and feed delivery data for the feedlot and the additional feedlots, and health risk characteristics assessed during initial arrival protocols and derived from the data identifying the one or more animals that includes one or more of a distance traveled, a weaning status, a vaccinations status, a gender, and a shrink weight, generate an animal health profile of livestock tracking and management characteristics over the feeding period for the one or more animals, predict the health changes in one or more specific animals over the feeding period, and identify specific health risk characteristics impacting the predicted health changes; and applying the animal health profile of livestock tracking and management to adjust the initial arrival protocols at the feedlot for one or more later-arriving animals exhibiting the same or similar health risk characteristics upon arrival at the feedlot to categorize a health risk for each later-arriving animal.

22. The method of claim 21, further comprising generating, as output data, an identification of a predicted health change for the one or more specific animals over the feeding period, and an identification of one or more temporal decision points over the feeding period for addressing the predicted health change in the one or more specific animals, based on the animal health profile.

23. The method of claim 21, further comprising generating an initial diagnosis of a health change in the one or more specific animals that includes one or more of a peak weight, a drop in weight that exceed a pre-determined amount, and an increase in weight that exceeds a pre-determined amount, a livestock illness, and an identification of a trend indicative of a disease spread.

24. The method of claim 21, further comprising adjusting one or more a growth model or a dairy production model for the one or more specific animals in response to the predicted health changes for each of the one or more specific animals.

25. The method of claim 24, further comprising applying the predicted health changes for the one or more specific animals to adjust the one or more of a growth model or a dairy production model for the one more animals at the feedlot.

26. The method of claim 21, further comprising generating a targeted application schedule for an allocation of resources to address the predicted health changes for the one or more specific animals at the one or more temporal decision points over the feeding period.

27. The method of claim 21, wherein the augmented data further includes observed animal health changes at the feedlot and additional feedlots across the multiple geographical locations, the observed animal health changes including one or more of a change in an animal health condition, a change in an animal dietary or nutrition condition, a change in an animal growth condition, and a change in an animal behavior condition, and wherein the weights assigned to the input data and the one or more events are derived from the observed animal health changes.

28. The method of claim 21, wherein the weather data includes historical and current weather information for at least one geographical location in the multiple geographical locations, and further includes one or more of temperature, moisture, precipitation, wind speed, solar radiation, and humidity for each geographical location or for a geographical location each reader is located.

29. The method of claim 21, wherein the producer-augmented data further includes data representative of a type of enclosure in which the one or more animals are maintained, field conditions where the one or more animals are maintained, and conditions of pasture far the one or more animals.

30. The method of claim 21, wherein the nutrition data further includes one or more of an ingredient composition, a diet, a ration, a feeding history, types of forage available to the one or more animals, and water data.

* * * * *